(No Model.)

H. W. LIBBEY.

HOOD ATTACHMENT FOR BICYCLES.

No. 339,793. Patented Apr. 13, 1886.

UNITED STATES PATENT OFFICE.

HOSEA W. LIBBEY, OF BOSTON, MASSACHUSETTS.

HOOD ATTACHMENT FOR BICYCLES.

SPECIFICATION forming part of Letters Patent No. 339,793, dated April 13, 1886.

Application filed June 25, 1885. Serial No. 169,698. (No model.)

*To all whom it may concern:*

Be it known that I, HOSEA W. LIBBEY, a citizen of the United States, residing at Boston, in the county of Suffolk and State of Massachusetts, have invented a new and Improved Sun and Rain Protection Attachment for Bicycles and Tricycles, of which the following is a specification.

The object of my invention is to provide a means for protecting riders of bicycles and tricycles from exposure to the sun and rain; and the invention consists in the employment of an adjustable hood or protector arranged over the rider and connected by means of a suitable adjustable frame or support to the steering-bar of the bicycle or tricycle.

The invention further consists in certain details of construction hereinafter fully set forth.

Figure 1:
Figure 2:
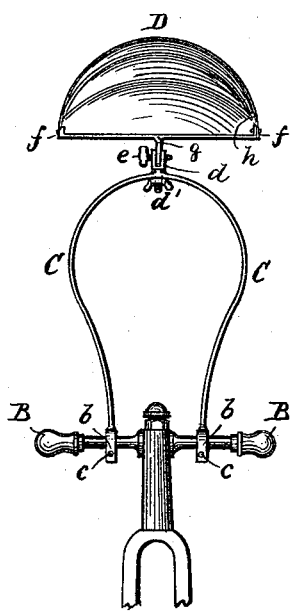
Figure 3:
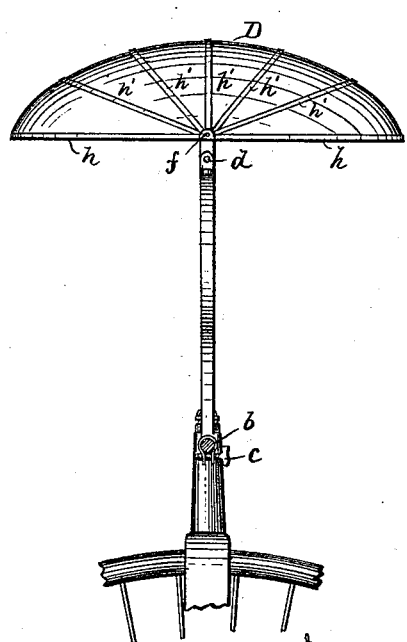

Referering to the accompanying drawings, Figure 1 is a perspective view showing my invention as applied to a bicycle. Fig. 2 is a front view of the hood and frame as attached to the steering-bar of a bicycle or tricycle. Fig. 3 is a side view of the same.

A represents the wheel, and B the steering-bar, of a bicycle of the ordinary construction.

C C is a frame consisting of a light iron rod or bar, and secured at its lower ends, by means of clamps and screws $b\ c$, to the steering-bar B, as shown in Fig. 2, so that the frame can be adjusted and held at any desired inclination, and also be readily attached to and detached from the steering-bar. To the upper part of the frame C is attached a clamp, $d$, having a screw-rod on its under side, which passes through the top of the frame C, and is secured in position by means of a thumb-screw, $d'$. Within the clamp $d$ is a bar, $g$, which is secured and held in position by a thumb-screw, $e$. To the upper end of the bar $g$ are pivoted, at $f\ f$, two semicircular frames, $h\ h$, and also the frames or curved bars $h'\ h'$, all of which are to be covered with canvas, cloth, or other suitable material, and when desirable with a water-proof material, thus forming a hood or complete protection, D, to the rider from the sun and rain. The frame $h\ h'$ can be partially or wholly folded, in a manner similar to the top of a chaise or buggy.

By means of the connection with the top of the frame C the hood D can be turned and adjusted horizontally and held in position by the thumb-screw $d'$, and by means of the connection of the bar $g$ with the clamp $d$ the hood can be adjusted to any desired degree of inclination, which can be effected by the rider at will. The hood and its connection can also be as readily applied to tricycles.

Instead of the clamp $d$, as described, the lower end of the bar $g$ may be formed with a ball fitting in a socket, constituting a ball-and-socket joint.

What I claim as my invention, and desire to secure by Letters Patent, is—

1. The combination, with a bicycle or tricyle, of an adjustable hood, D, and a supporting-frame, C, attached to the steering-bar B, substantially as shown, and for the purpose set forth.

2. The combination of the folding hood D, the adjustable frames $h\ h'$, the bar $g$, clamp $d$, and thumb-screw $e$, with the frame C, as shown and described.

3. The combination, with the steering-bar B, of the frame C, the clamps $b\ b$, and thumb-screw $c$, as shown and described.

In testimony whereof I have signed my name to this specification in the presence of two subscribing witnesses.

HOSEA W. LIBBEY.

Witnesses:
J. H. ADAMS,
E. PLANTA.